US 8,131,945 B2

(12) United States Patent
Hutton et al.

(10) Patent No.: US 8,131,945 B2
(45) Date of Patent: Mar. 6, 2012

(54) DISOWNING CACHE ENTRIES ON AGING OUT OF THE ENTRY

(75) Inventors: David S. Hutton, Poughkeepsie, NY (US); Kathryn M. Jackson, Poughkeepsie, NY (US); Keith N. Langston, Woodstock, NY (US); Pak-kin Mak, Poughkeepsie, NY (US); Chung-Lung K. Shum, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 324 days.

(21) Appl. No.: 12/435,468

(22) Filed: May 5, 2009

(65) Prior Publication Data
US 2010/0030965 A1 Feb. 4, 2010

Related U.S. Application Data

(63) Continuation of application No. 11/339,196, filed on Jan. 25, 2006, now Pat. No. 7,577,795.

(51) Int. Cl.
*G06F 12/00* (2006.01)

(52) U.S. Cl. ........ 711/141; 711/118; 711/119; 711/122; 711/144; 711/146

(58) Field of Classification Search .......... 711/118–119, 711/122–123, 133, 141, 144, 146, 156, E12.001, 711/E12.023, E12.024

See application file for complete search history.

(56) References Cited

U.S. PATENT DOCUMENTS

| | | | |
|---|---|---|---|
| 5,265,232 A | 11/1993 | Gannon |
| 5,809,526 A | 9/1998 | Patel |
| 5,926,830 A | 7/1999 | Feiste |
| 5,963,978 A | 10/1999 | Feiste |
| 6,269,425 B1 | 7/2001 | Mounes-Toussi |
| 6,405,322 B1 | 6/2002 | Gaither |
| 6,532,520 B1 | 3/2003 | Dean |
| 6,542,926 B2 | 4/2003 | Zalewski |
| 6,557,084 B2 | 4/2003 | Freerksen |
| 6,640,289 B2 | 10/2003 | McCrory |
| 6,658,539 B2 | 12/2003 | Arimilli |
| 6,662,275 B2 | 12/2003 | Arimilli |
| 6,715,040 B2 | 3/2004 | Wang |
| 6,738,870 B2 | 5/2004 | Van Huben |
| 6,738,871 B2 | 5/2004 | Van Huben |
| 6,745,292 B1 | 6/2004 | Stevens |
| 6,807,619 B1 | 10/2004 | Ezra |
| 6,826,654 B2 | 11/2004 | Arimilli |
| 6,851,024 B1 | 2/2005 | Wilkes |

(Continued)

FOREIGN PATENT DOCUMENTS

CN 1093961 C 11/2002

(Continued)

*Primary Examiner* — Jasmine Song
(74) *Attorney, Agent, or Firm* — John E. Campbell; Graham S. Jones

(57) ABSTRACT

Caching where portions of data are stored in slower main memory and are transferred to faster memory between one or more processors and the main memory. The cache is such that an individual cache system must communicate to other associated cache systems, or check with such cache systems, to determine if they contain a copy of a given cached location prior to or upon modification or appropriation of data at a given cached location. The cache further includes provisions for determining when the data stored in a particular memory location may be replaced.

30 Claims, 3 Drawing Sheets

U.S. PATENT DOCUMENTS

| | | |
|---|---|---|
| 6,868,485 B1 | 3/2005 | Conway |
| 6,981,106 B1 * | 12/2005 | Bauman et al. ............... 711/146 |
| 7,039,765 B1 | 5/2006 | Wilkes |
| 7,284,097 B2 | 10/2007 | Dodson |
| 2004/0143712 A1 | 7/2004 | Armstrong |

FOREIGN PATENT DOCUMENTS

| | | |
|---|---|---|
| JP | 2001-034533 A | 9/2001 |

* cited by examiner

DISOWNING CACHE ENTRIES ON AGING OUT OF THE ENTRY

CROSS-REFERENCE TO RELATED APPLICATIONS

This is a continuation of application Ser. No. 11/339,196, which was filed on 25 Jan. 2006, now U.S. Pat. No. 7,577,795 issued 18 Aug. 2009. The entire disclosure of prior application Ser. No. 11/339,196 is incorporated herein by reference.

BACKGROUND OF THE INVENTION

The invention relates to caching where portions of data are stored in slower main memory and are transferred to faster memory between one or more processors and the main memory. The system is such that an individual cache system must announce to other cache systems or check with other cache systems which may possibly contain a copy of a given cached location prior to or upon modification or appropriation of data at a given cached location, and includes provisions for determining when the data stored in an particular memory location may be replaced.

When a processor, e.g., processor A, requests a given line for store ("EX" or exclusive request) that given line is installed in both the L1 and the L2 caches as exclusive to processor A. When another processor, e.g., processor B, requests the given line, processing is elongated if the given line is held exclusive to processor A.

However, as is often the case, processor A is no longer using the given line, and, in fact the given line has aged out of the L1 cache and is only in the L2 cache. Nevertheless, the given line is still marked exclusive to processor A. Thus extra processing, such as cross investigating and cross invalidating, is required to remove this given line from the L1 cache.

In many cases as described here, this given line no longer exists in the L1cache. This unnecessarily elongates the fetch request for the processor B, reducing performance. Thus a need exists to speed up this process.

In many cases as described here, this line no longer exists in L1. This unnecessarily elongates the fetch request for processor B, reducing performance. Thus a need exists to speed up this process.

SUMMARY OF THE INVENTION

The method and system described herein provides caching where portions of data are stored in slower main memory and are transferred to faster memory between one or more processors and the main memory. As a general rule, the cache is such that an individual cache system must communicate to other associated cache systems, or check with such cache systems, to determine if they contain a copy of a given cached location prior to or upon modification or appropriation of data at a given cached location. The cache further includes provisions for determining when the data stored in a particular memory location may be replaced.

By way of background, a line must exist in L1 cache to be used by any processor. Now, when a line exists in both L1 and L2, the state of the line is said to match in both caches. That is, the line is either marked exclusive, shared, modified the same in both levels. If a line ages out of L1 and only resides in L2, then that line is no longer in use by the original processor. More recently used lines have replaced that line. However, the L2 cache continues to hold the line in a state of "Exclusive" to that processor.

The method and system described herein changes the state of the line in the L2 cache when the line is to be replaced in the L1 cache. The state changes from exclusive to a particular identified processor to exclusive to no processor. Thus, when an exclusive line ages out of a particular processor, the line state in L2 will change from exclusive to the particular identified processor to "none", and no cross interrogation or invalidation is necessary for any L1 cache, thereby improving overall system performance.

THE DRAWINGS

DETAILED DESCRIPTION

Caching where portions of data are stored in slower main memory and are transferred to faster memory between one or more processors and the main memory. The cache is such that an individual cache system must communicate to other associated cache systems, or check with such cache systems, to determine if they contain a copy of a given cached location prior to or upon modification or appropriation of data at a given cached location. The cache further includes provisions for determining when the data stored in a particular memory location may be replaced.

As described herein, when an exclusive line ages out of an L1 cache, the L1cache sends a signal to the L2 cache, indicating that the given line no longer exists in the L1 cache. This causes the L2 cache to be updated to indicate that the given line is "disowned." That is, the ownership is changed from the particular processor to "unowned."

By way of background, despite improvements in technology, microprocessors are still much faster than main memory. Memory access time is increasingly the bottleneck in overall application performance. As a result, an application might spend a considerable amount of time waiting for data. This not only negatively impacts the overall performance, but the application cannot benefit much from a processor clock-speed upgrade either.

One way to overcome this problem is to insert a small high-speed buffer memory between the processor and main memory. Such a buffer is generally referred to as cache memory, or cache for short. Such a buffer or cache is illustrated in FIG. 1.

Figure 1:
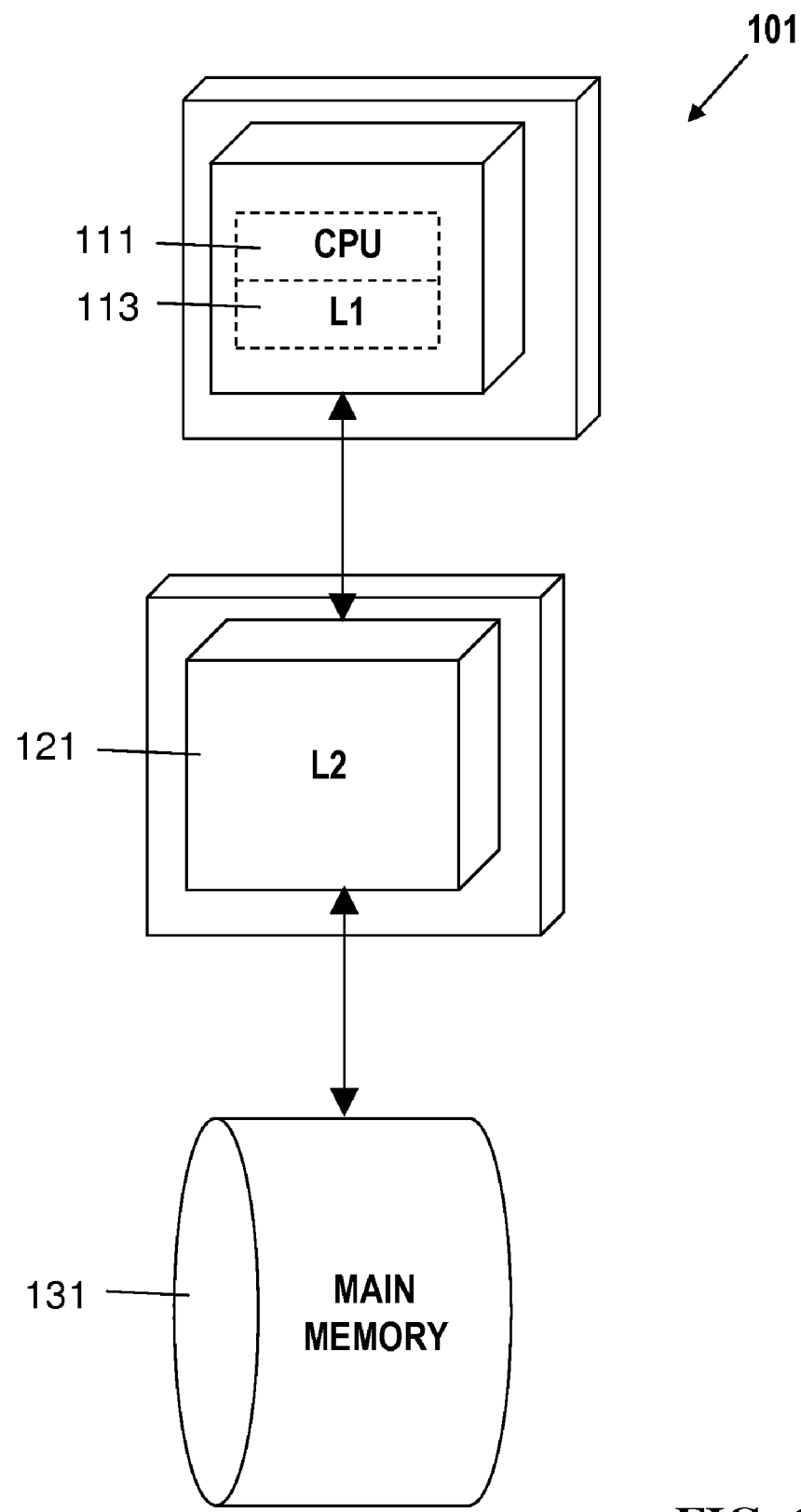
FIG. 1 illustrates a processor and L1 cache, an L2 cache, and main memory.

FIG. 1 illustrates a processor system 101 including a processor 111, and L1 cache 113, an L2 cache 121, and a main memory 131. The application running on the system takes advantage of this enhancement by fetching data from the cache 113 instead of main memory 131. Thanks to the shorter access time to the L1 cache 113, application performance is improved. Of course, there is still traffic between memory 131 and the cache 113, but it is minimal.

The system 101 first copies the data needed by the processor 111 from main memory 131 into the L2 cache 121, and then from the L2 cache 121 to the L1 cache 113 and into a register (not shown) in the processor 111. Storage of results is in the opposite direction. First the system copies the data from the processor 111 into the L1 cache 113, and from the L2 cache 121. Depending on the cache architecture details, the data is then immediately copied back to memory 131 (writethrough), or deferred (write-back). If an application needs the same data again, data access time is reduced significantly if the data is still in the L1 cache 113 and L2 cache 121 or only the L2 cache 121. To further reduce the cost of memory transfer, more than one element is loaded into cache. The unit of transfer is called a cache block or cache line. Access to a single data element brings an entire line into the cache. The line is guaranteed to contain the element requested.

Latency and bandwidth are two metrics associated with caches and memory. Neither of them is uniform, but is specific to a particular component of the memory hierarchy. The latency is often expressed in processor cycles or in nanoseconds, while bandwidth is usually given in megabytes per second or gigabytes per second.

In practice the latency of a memory component is measured as the time it takes to fetch the first portion of a unit of transfer (typically a cache line). As the speed of a component depends on its relative location in the hierarchy, the latency is not uniform. As a rule of thumb, it is safe to say that latency increases when moving from L1 cache 113 to L2 cache 121 to main memory 131.

Some of the memory components, the L1 cache 113 for example, may be physically located on the processor 111. The advantage is that their speed will scale with the processor clock. It is, therefore, meaningful to express the latency of such components in processor clock cycles, instead of nanoseconds.

On some microprocessors, the integrated (on-chip) caches, as L1 cache 113, do not always run at the speed of the processor. They operate at a clock rate that is an integer quotient (½, ⅓, and so forth) of the processor clock.

Cache components external to the processor do not usually, or only partially, benefit from a processor clock upgrade. Their latencies are often given in nanoseconds. Main memory latency is almost always expressed in nanoseconds.

Bandwidth is a measure of the asymptotic speed of a memory component. This number reflects how fast large bulks of data can be moved in and out. Just as with latency, the bandwidth is not uniform. Typically, bandwidth decreases the further one moves away from the processor 111.

If the number of steps in a data fetch can be reduced, latency is reduced.

Figure 2:
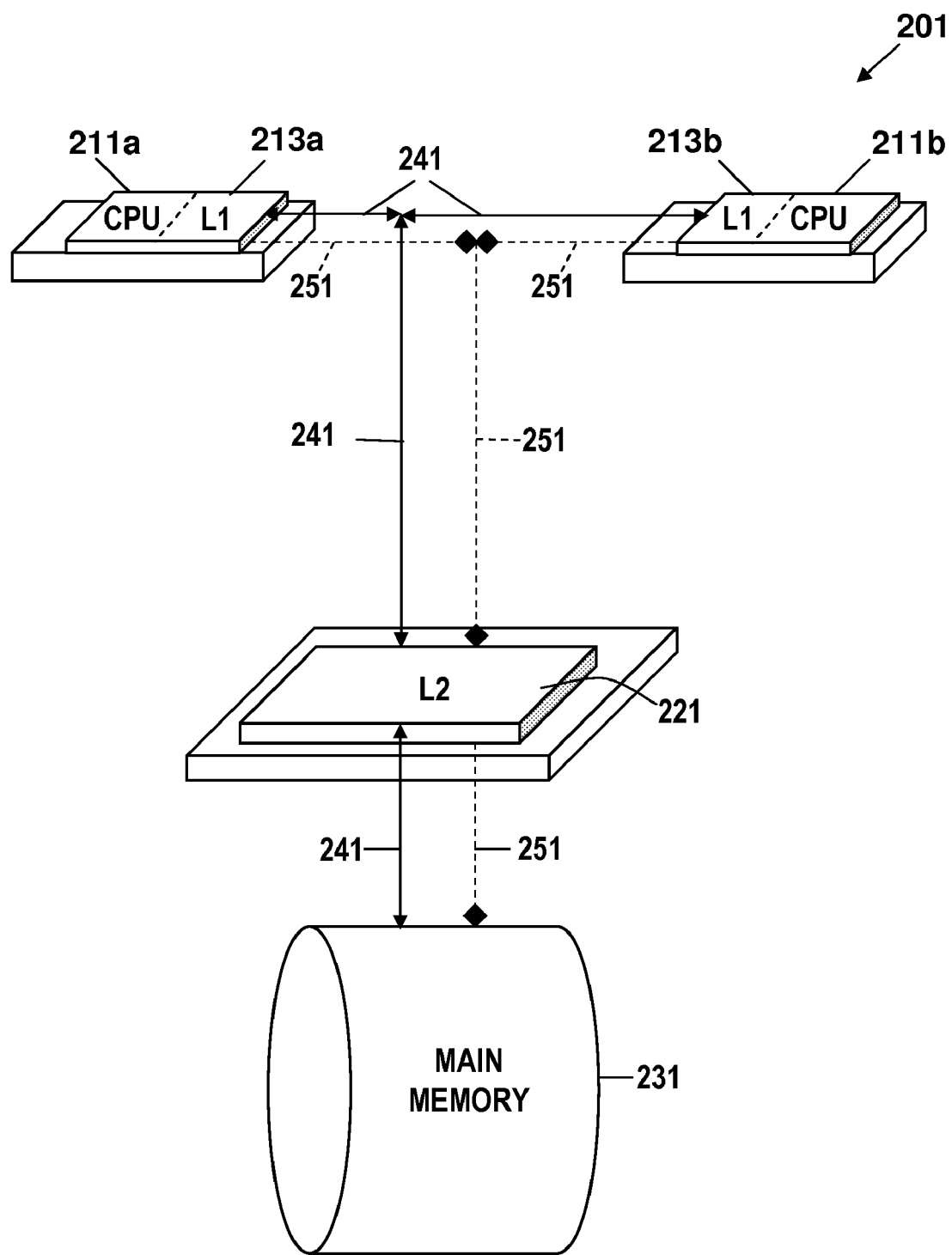
FIG. 2 illustrates a system including two processors with L1 caches, a shared L2 cache, and main memory.

FIG. 2 illustrates a system 201 including two central processors including central processor 211a with L1 cache 213a, and central processor 211b with L1 cache 213b, a shared L2 cache 221, and main memory 231. Data lines 241 and control lines 251 perform their normal function. With respect to FIG. 2, when an exclusive line ages out of an L1 cache 213a or 213b, the L1 cache 213a or L1 cache 213b sends a signal to the L2 cache 221, indicating that the line no longer exists in the L1 cache 213a or L1 cache 213b. This causes the L2 cache 221 to be updated to indicate that the given line is "disowned." That is, the ownership is changed from the particular central processor to "unowned."

Figure 3:
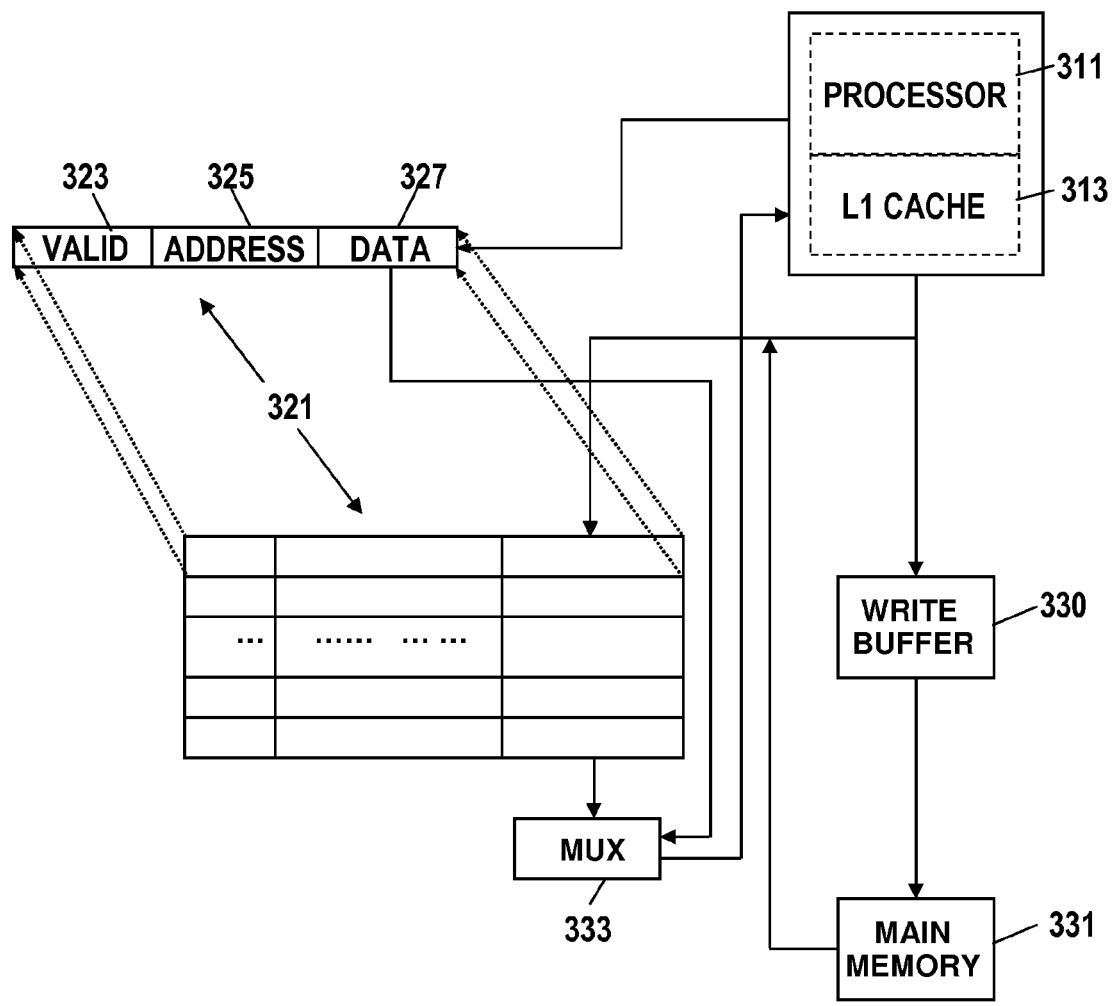
FIG. 3 illustrates a cache, a central processor unit, and main memory, with control and data lines, and valid, address, and data blocks in exemplary cache lines.

FIG. 3 illustrates components of a system 301 an L1 cache 313, a processor unit 311, an L2 cache 321, a write buffer, main memory 331, and a MUX 333, with control and data lines, and valid 323, address 325, and data 327 blocks in an exemplary cache line.

When an exclusive line ages out of an L1 cache 313, the L1 cache 313 sends a signal to the L2 cache 321, indicating that the line no longer exists in the L1 cache 313. This causes the L2 cache 321 to be updated to indicate that the line is "disowned." That is, the ownership is changed from the particular processor to "unowned."

Consider the cache shown in FIG. 3. The processor 311 presents a physical address to the L2 cache 321 for tag comparison. The address coming into the L2 cache 321 has two fields, a block address and an offset address, where the block address includes an address tag and indications of a cache index, as well as control data.

The cache index selects the tag to be tested to be see if the desired block is in the cache. The next step is index selection. In the case of direct mapping, the data is read and sent to the processor 311 in parallel with the tag being read and checked.

After reading the tag from the cache 321, it is compared to the tag portion of the block address from the processor 311. To be sure that the tag and the data line both contain valid information, the validity data (as exclusive to a processor on unowned") must be read and verified. If the cache data is valid, the processor 311 is signaled to load the data from the L2 cache 321.

In the case of a write, the data is also written to a write buffer, for writing to main memory.

In the case of a cache miss, the L1 cache 313 sends a stall signal to the processor 311, and a read to L2 cache 321 and then to the main memory 331. Reading from main memory replaces a line in cache, e.g., typically the least recently used line, including the data, the tags, and the validity information.

According to the method and system of the invention, when an exclusive line ages out of an L1 cache, and the L1 cache sends a signal to the L2 cache, this indicates that the line no longer exists in the L1 cache, thereby causing the L2 cache to be updated to indicate that the line is "disowned." That is, the ownership is changed from the particular processor to "unowned."

The embodiment of FIG. 2 improves performance by reducing and in some cases even eliminating cross interrogate processing. Eliminating cross interrogate processing avoids sending a cross interrogate to an L1 cache 213a or L1 cache 213b for a given line that, due to an L1 cache replacement or age out replacement and that given line no longer exists in the L1 cache 213a or L1 cache 213b. This results in a shorter latency when another central processor requests a line which may be the given line, and thereby avoids a fruitless directory lookup at the other L1 cache which had once owned the given line.

Additionally, eliminating cross interrogate processing avoids sending a cross invalidate to an L1 cache 213a or an L1 cache 213b for a given line that is to be replaced in the L2 cache 221. Ordinarily, when a given line ages out of the L2 cache 221, that given line must also be invalidated in the L1 cache 213a or the L1 cache 213b. This maintains a subset rule between the L1 cache 213a or the L1 cache 213b and the L2 cache 221. These two invalidates disrupt normal processing at the L1 cache 213a or the L1 cache 213b. If the given line no longer exists in the L1 cache 213a or the L1 cache 213b, this disruption is unnecessary and impacts performance negatively.

While the method and system have been described with respect to exclusive lines, it is to be understood that the method and system described herein also avoids cross interrogates and cross invalidates for shared lines when one updates an L2 cache directory 221 for shared lines that age out of the L1 cache 211a or the L1 cache 211b.

If an L1 shared cache implementation maintains a separate bit for each processor to identify which L1 caches "hold the line", each time a line ages out of the L1 cache 211a or the L1 cache 211b, the respective "central processor (CP) holds the line" bit in the L2 cache 221 could be reset. Cross interrogates and cross invalidates need to be performed only to CP's having their "CP holds line" bit active. If all bits are inactive, all cross interrogates and cross invalidates are avoided. In this way, L2 cache 221 age out replacements avoid unnecessary cross invalidates to the L1 cache 213a or the L1 cache 213b. This too improves performance by avoiding unnecessary disruptions at the L1 cache 213a or the L1 cache 213b.

A further aspect of the invention is a program product comprising computer readable program code to configure and control a computer system. The computer system comprises a plurality of microprocessors, where each microprocessor has an associated L1 cache 213a or 213b, an L2 cache 221 associated to the L1 caches 213a and 213b, and main memory 231. The program product causes the caches to store portions of data for transfer to and from the processors and the main memory, and to further cause an individual cache communicating to other associated caches to check with the said other caches, to determine if they contain a copy of a given cached location prior to reading data from, reading data to, or modifying cached data. The computer code also determines when the data stored in a particular cache memory location may be replaced.

Specifically, the computer code writes changes to the state of the line in the L2 cache when the line is to be replaced in the L1 cache, and also changes the state of the line from exclusive to a particular identified processor to exclusive to no processor.

While the invention has been described with certain preferred embodiments and exemplifications, it is not intended to limit the scope of the invention thereby, but solely by the claims appended hereto.

What is claimed is:

1. A data caching method for reducing cross-interrogation latency in a computer system in a processor in communication with a high-speed buffer memory comprising an L1 cache memory and an L2 cache memory, said method comprising the steps of:
copying data needed by said processor from a cache line in said L2 cache memory into a cache line in said L1 cache memory;
copying said data needed by said processor from said L1 cache memory into a register in said processor, wherein said L2 cache memory includes an indication that said cache line stored in said L1 cache memory is owned;
responding to said cache line in said L1 cache memory aging out by sending a signal updating said associated L2 cache memory to indicate that said cache line that aged out of said L1 cache memory is disowned; and
updating said L2 cache memory upon receipt of said signal to indicate that said cache line in said L1 cache memory is disowned.

2. The data caching method of claim 1 wherein each of a plurality of processors is provided with a separate L1 cache memory, each said L1 cache memory being connected to a shared L2 cache memory, said method including the following steps:
maintaining a separate processor-holds-the-line bit in said L2 cache memory for each processor to identify which one of said L1 cache memories holds a cache line wherein the cache line being held is owned exclusively until it is disowned; and
resetting a said separate processor-holds-the-line bit in said L2 cache memory each time a line ages out of a said L1 cache memory.

3. The data caching method of claim 1 including the step of presenting a physical address from one of said processor to said L2 cache memory wherein said physical address includes a block address and an offset address, with said block address including an address tag and indications of a cache index, as well as control data.

4. The data caching method of claim 3 including the step of performing index selection.

5. The data caching method of claim 3 including the step of selecting a said address tag to be tested with said cache index to see if a desired block is in a said cache memory.

6. The data caching method of claim 5 including the step of performing index selection.

7. The data caching method of claim 3 including direct mapping by the steps of:
reading data; and
sending said data to a said processor in parallel with reading and checking said address tag and a data line.

8. The data caching method of claim 7 wherein after reading said tag from the cache memory, performing the step of comparing said address tag to a tag portion of said block address from a said processor to be sure that said address tag and said data line both contain valid information.

9. The data caching method of claim 8 including the step of signaling the processor to load data from said L2 cache memory if said cache data is valid.

10. The data caching method of claim 3 including the steps of:
sending a stall signal from a said L1 cache memory to a said processor in the case of a cache miss;
sending a read to said L2 cache and then sending a read to a main memory;
reading from said main memory; and
replacing a cache line.

11. A data caching system for reducing cross-interrogation latency, said data caching system comprising:
a main memory; an L2 cache memory in communication with said main memory capable of communicating with one or more processors each having a corresponding L1 cache memory; a said L1 cache memory in communication with said L2 cache memory; and
a processor, in communications with said L1 cache memory, wherein said computer system is capable of performing a method comprising:
copying data needed by said processor from a cache line in said L2 cache memory into a cache line in said L1 cache memory;
copying said data needed by said processor from said L1 cache memory into a register in said processor, wherein said L2 cache memory includes an indication that said cache line stored in L1 cache memory is owned;
responding to said cache line in said L1 cache memory aging out by sending a signal updating said associated L2 cache memory to indicate that said cache line that aged out of said L1 cache memory is disowned; and
updating said L2 cache memory upon receipt of said signal to indicate that said cache line in said L1 cache memory is disowned.

12. The system of claim 11 wherein each of a plurality of processors is provided with a separate L1 cache memory, each said L1 cache memory being connected to a shared L2 cache memory, including performing the steps as follows:
maintaining a separate processor-holds-the-line bit in said L2 cache memory for each processor to identify which one of said L1 cache memories holds a cache line wherein the cache line being held is owned exclusively until it is disowned; and
resetting a said separate processor-holds-the-line bit in said L2 cache memory each time a line ages out of a said L1 cache memory.

13. The system of claim 11 including performing the step of presenting a physical address from one of said processors to said L2 cache memory wherein said physical address includes a block address and an offset address, with said block address including an address tag and indications of a cache index, as well as control data.

14. The system of claim 13 including performing the step of index selection.

15. The system of claim 13 including the step of selecting a said address tag to be tested with said cache index to see if a desired block is in a said cache memory.

16. The system of claim 15 including the step of performing index selection.

17. The system of claim 13 including direct mapping by the steps of:
reading data; and
sending said data to a said processor in parallel with reading and checking said address tag and a data line.

18. The system of claim 17 wherein after reading said tag from the cache memory, performing the step of comparing said address tag to a tag portion of said block address from a said processor to be sure that said address tag and said data line both contain valid information.

19. The data caching method of claim 18 including the step of signaling the processor to load data from said L2 cache memory if said cache data is valid.

20. The system of claim 13 including the steps as follows:
sending a stall signal from a said L1 cache memory to a said processor in the case of a cache miss;
sending a read to said L2 cache, and then sending a read to a main memory;
reading from said main memory; and
replacing a cache line.

21. A computer program product for caching data for a processor in communication with a high speed buffer memory comprising an L1 cache memory and an L2 cache memory, said computer program product comprising a storage medium readable by a processor and storing instructions for execution by said processor for performing a method comprising:
copying data needed by said processor from a cache line in said L2 cache memory into a cache line in said L1 cache memory;
copying said data needed by said processor from said L1 cache memory into a register in said processor, wherein said L2 cache memory includes an indication that said cache line stored in L1 cache memory is owned;
responding to said cache line in said L1 cache memory aging out by sending a signal updating said associated L2 cache memory to indicate that said cache line which aged out of said L1 cache memory is disowned; and
updating said L2 cache memory upon receipt of said signal to indicate that said cache line in said L1 cache memory is disowned.

22. The computer program product of 21 wherein each of a plurality of processors is provided with separate L1 cache memories which are connected to a shared L2 cache memory, including:
maintaining a separate processor-holds-the-line bit in said L2 cache memory for each processor to identify which one of said L1 cache memories holds a cache line wherein the cache line being held is owned exclusively until it is disowned; and
resetting a said separate processor-holds-the-line bit in said L2 cache memory each time a line ages out of a said L1 cache memory.

23. The computer program product of claim 21 including the step of presenting a physical address from one of said processors to said L2 cache memory wherein said physical address includes a block address and an offset address, with said block address including an address tag and indications of a cache index, as well as control data.

24. The computer program product of claim 23 including the step of performing index selection.

25. The computer program product of claim 23 including the step of selecting a said address tag to be tested with said cache index to see if a desired block is in a said cache memory.

26. The computer program product of claim 25 including the step of performing index selection.

27. The computer program product of claim 23 including direct mapping by the steps of:
reading data; and
sending said data to a said processor in parallel with reading and checking said address tag and a data line.

28. The computer program product of claim 27 wherein after reading said tag from the cache memory, performing the step of comparing said tag to a tag portion of said block address from a said processor to be sure that said address tag and said data line both contain valid information.

29. The computer program product of claim 28 including the step of signaling the processor to load data from said L2 cache memory if said cache data is valid.

30. The computer program product of claim 23 including the steps as follows:
sending a stall signal from a said L1 cache memory to a said processor in the case of a cache miss;
sending a read to said L2 cache, and then sending a read to a main memory; reading from said main memory; and replacing a cache line.

* * * * *